United States Patent Office 3,404,604
Patented Oct. 8, 1968

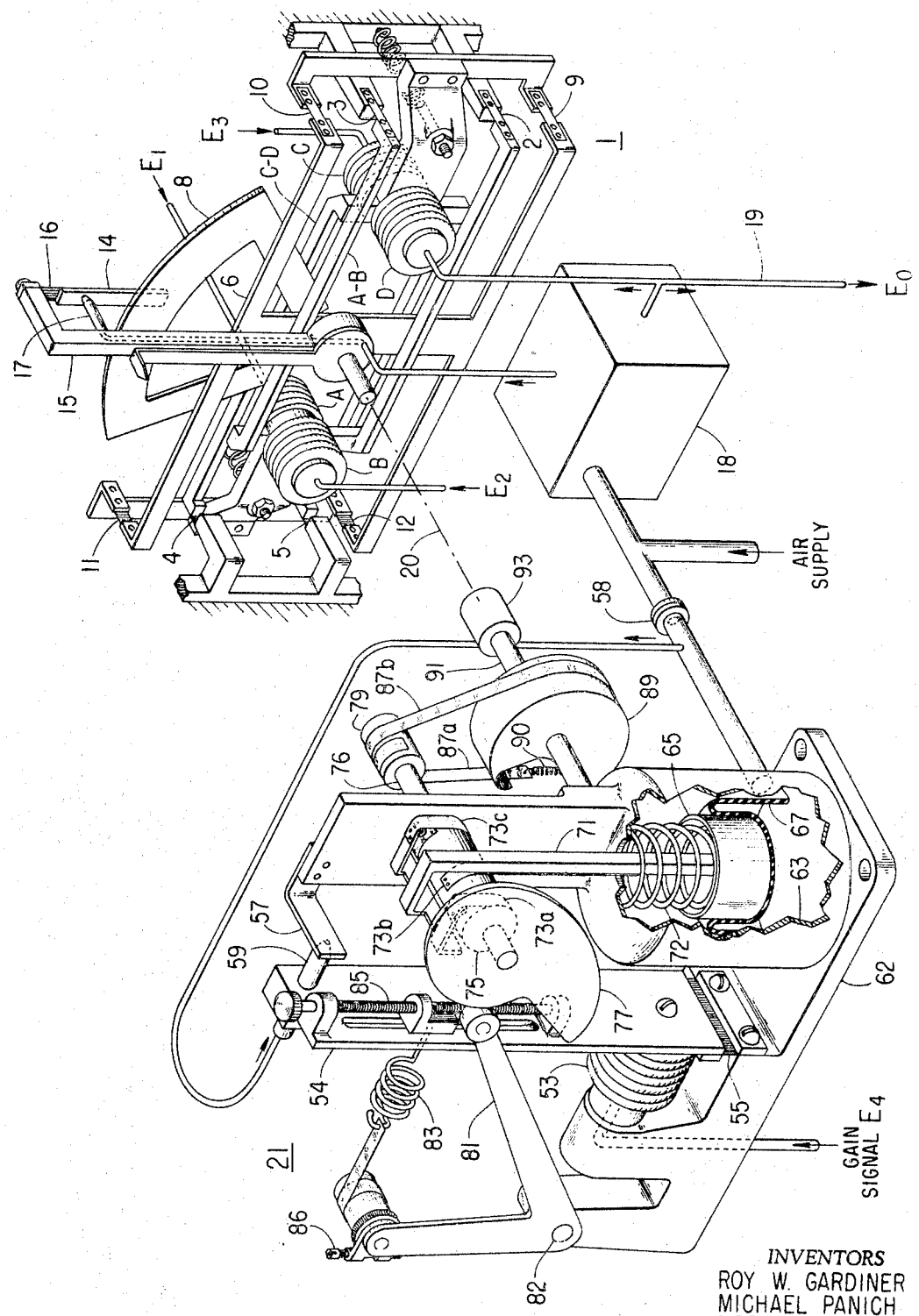

3,404,604
PNEUMATIC SERVOMOTOR HAVING FORCE BEAM INPUT AND SPRING TYPE FEEDBACK
Roy W. Gardiner, Richmond Heights, Michael Panich, Willoughby, and Norman J. Yager, Euclid, Ohio, assignors to Bailey Meter Company, a corporation of Delaware
Filed Sept. 28, 1967, Ser. No. 671,293
1 Claim. (Cl. 91—47)

ABSTRACT OF THE DISCLOSURE

A pneumatic servo-motor producing angular displacement of an output shaft in functional relation to changes in a pneumatic signal.

*Background of the invention.*—This invention is in the field of pneumatic control and relates specifically to a pneumatic servo-motor for adjusting the gain of a pneumatic controller. Prior art devices have been limited to a straight mechanical means or servo-devices providing only linear adjustment of the gain with respect to changes in the input signal.

*Summary of the invention.*—A pneumatic servo-motor incorporating a vane-nozzle couple, one element of which is positioned by a pneumatic input signal and the other element of which is positioned through a feedback mechanism also driving an output shaft and incorporating a cam which may be shaped so as to obtain any desired functional relationship between changes in the input signal and displacement of the output shaft.

*Brief description of the drawing.*—The drawing shows in perspective, a pneumatic servo-motor incorporating our invention and arranged to adjust the gain of a pneumatic controller.

*Description of the preferred embodiment.*—Referring to the drawing, there is shown a pneumatic controller in which the gain setting is automatically adjusted by a gain-adjusting servo embodying our invention. The controller, generally indicated at 1, is a Bailey MINI-LINE 500 Controller Type AD5 described in Bailey Meter Company Product Specification P92-2. A loading pressure is introduced into one or the other or both bellows A and B through connections E1 and E2 respectively. The movable ends of the bellows exert opposing forces on an A–B beam proportional to the magnitude of the loading pressures therein causing a positioning of the beam about leaf spring pivots 2 and 3. Similarly, the movable ends of bellows C and D exert opposing forces on a C–D beam proportional to the pressures therein causing a positioning of the beam about leaf spring pivots 4 and 5. Carried by and between the free ends of the A–B and C–D beams is a differential beam 6 on which is mounted a sector plate 8. Change in pressure within the bellows A or B causes a positioning of the differential beam 6 about leaf spring pivots 9 and 10; whereas, a change in pressure within bellows C or D causes a positioning of the differential beam about leaf spring pivots 11 and 12. Thus, it will be observed an increase in pressure in bellows A or a given amount will cause sector plate 8 to be angularly positioned about leaf spring pivots 9 and 10 a predetermined amount in a counterclockwise direction and an increase in pressure in belows D or the same amount will cause sector plate 8 to be angularly positioned in the same direction about leaf spring pivots 11 and 12 the same predetermined amount.

Bearing against the surface of sector plate 8 is a vane 14 which is carried by a gain arm 15 through a leaf spring pivot 16. Also carried by the gain arm 15 is a nozzle 17 which is supplied with air from a booster unit 18. As understood by those familiar with the art, movement of the vane 14 toward and away from nozzle 17 will produce proportionate increases and decreases in air pressure in the nozzle, which, in the booster unit, are proportionately amplified. The amplified pressure is the output signal $E_0$ available in pipe 19. This amplified pressure is also introduced into bellows D as a negative feed back signal.

The gain arm 15 is carried on an angularly positionable gain arm shaft 20. If the gain arm 15 is in the position shown in the drawing; that is, so that the nozzle-vane couple is mid-way between bellows A–B and C–D, a change in pressure in bellows A will produce an equal change in pressure in bellows D; or, in other words, the controller has a gain of one. It will be apparent that as the gain arm 15 is positioned in a counterclockwise position; that is, toward the A–B bellows, the gain will become proportionately greater and, as positioned in a clockwise direction, proportionately smaller. Thus, the output signal generated by the controller in relation to the input signal may be expressed as:

$$E_0 = E_1 \times G$$

where:
$E_0$ is the output signal from booster 18
$E_1$ is the input signal to bellows A
$G$ is the gain While this equation indicates bellows A and D only being used, which is the case where direct proportional action is desired, by introduction of the proper pressures into bellows C and B and interconnections therebetween, as explained in the aforesaid Bailey Meter Company Product Specification P92-2, the controller can produce an output signal according to the control action desired such as proportional, proportional plus integral, proportional plus derivative, proportional plus feed forward and the like.

As evident from an inspection of the drawing, the gain of controller 1 may be manually varied by angularly positioning the gain arm shaft 20 which is the usual arrangement; however, frequently it is desirable to automatically adjust the gain so that the output signal $E_0$ will vary in functional relationship to the input signal $E_1$, and it is to a gain adjusting servo whereby this may be accomplished that our invention is directed.

Referring to the drawing, the servo embodying our invention is generally indicated at 21. There is shown a support structure 62 on which is mounted a cylinder 63 having a cooperating piston 65 to which it is sealed by a rolling diaphragm 67. Also carried by the structure 62 are supporting members (not shown) for a tape drum shaft 76 and an output shaft 91. On the support structure 62 are also mounted a cam follower 81, signal bellows 53, a force beam 54 and a vane 57.

The servo is sensitive to a gain signal $E_4$ and acts to angularly position the gain arm shaft 20 through output shaft 91 and flexible coupling 93 whenever a change in this signal occurs. The gain signal $E_4$ may be representative of a process variable or it may be independent of the process controlled by controller 1.

The output shaft 91 is rotated by means of a driven pulley 89 which is driven by a drive pully 79 through thin metal tapes 87a and 87b. The shaft rotation developed by driven pulley 89 is a function of the shape of a cam 77. The shape of this cam determines the amount of controller gain arm 15 rotation that will take place for any given change in the gain signal $E_4$ to sensing bellows 53. Therefore, the function generating capabilities of the gain control mechanism are dictated by the shape of cam 77.

The free end of sensing bellows 53 is connected to force beam 54 which serves as a support for a nozzle 59.

Force beam 54 pivots about a leaf spring pivot 55 in response to movements of bellows 53. The force beam displacement caused by movement of bellows 53 disrupts the preset space relationship of nozzle 59 and vane 57. This space relationship is similar to that discussed concerning the vane-nozzle assembly of controller 1 except that the back pressure provided by the vane-nozzle 57–59 is established by the air pressure source acting through an orifice 58 which is common to the piston cylinder 63.

Assume, for the purpose of discussion, that an increasing pressure change was sensed by bellows 53 causing the force beam 54 to rotate a proportionate amount clockwise about leaf spring pivot 55 thereby reducing the distance between nozzle 59 and vane 57. The preset leak rate from nozzle 59, which establishes a predetermined nozzle back pressure, will be reduced, thereby increasing the nozzle back pressure and causing an unbalanced condition. The increase in nozzle back pressure is also transmitted to cylinder 63 and is effective for causing the piston 65 to rise. The change in position of piston 65 is determined by the piston area and the variable downward force acting on the piston by a spring 72.

The response of piston 65 to a change in signal input pressure is transmitted to three thin metal tapes 73a, 73b and 73c by means of a piston rod 71 rigidly connected to the piston 65. One end of each of the three metal tapes 73a, 73b and 73c is attached to a tape drum 75 and wrapped about its circumference. The other end of each metal tape is connected to the piston rod 71 in such a relationship that during a vertical upward movement thereof, for example, tapes 73a and 73c will unwrap and tape 73b will wrap around tape drum 75. Conversely, upon a downward movement of piston rod 71, tapes 73a and 73c will wrap around tape drum 75 and tape 73b will unwrap. In this way, linear movements of piston 65 are converted into rotational motion of tape drum 75 and cam 77.

The rotational motion imparted to cam 77 by piston 65 positions cam follower 81 which pivots about a bearing 82. The cam follower 81 is connected to force beam 54 through a range spring 83. The range spring 83 is connected to the force beam 54 by means of a range adjustment screw 85 and acts in a direction to oppose the motion of the force beam 54 produced by changes in gain signal E4. The cam follower movement produced by cam rotation responding to an increase in pressure in bellows 53, for example, would be counterclockwise about bearing 82, thereby increasing the tension in range spring 83 which would, in turn, re-establish the preset space relationship between vane 57 and nozzle 59. Thus, at balance conditions, the forces acting on the force beam 54 from the sensing bellows 53 and range spring 83 are equal and opposite. As shown, range spring 83 may be secured to cam follower 81 through an adjustment screw 86 providing a means to increase or decrease the tension in range spring 83 to establish the preset nozzle-vane relationship for a given gain signal. Range adjustment screw 85 provides a means of establishing a given movement of force beam 54 for a given change in gain signal to bellows 53 thereby producing a desired rotation of cam 77 for a given change in gain signal.

Thin metal tapes 87a and 87b are wrapped in opposite directions around the circumference of drive pulley 79. The opposite end of each tape is connected to the circumference of driven pulley 89. Rotation of the drive pulley 79 causes one tape to wrap and the other tape to unwrap around the circumference of drive pulley 79 resulting in angular rotation of driven pulley 89 without backlash. Tape connections to driven pulley 89 may be reversed to establish driven pulley rotation in the same direction as rotation of the drive pulley or rotation in the opposite direction. Also, as shown, metal tape 87a may be connected to driven pulley 89 through a tension spring 90 to thereby maintain the tapes under tension and free of slack.

The rotation of driven pulley 89, as transmitted by output shaft 91 to gain arm 15, is a function of gain signal E4. This functional relationship is determined by the shaping of cam 77, adjustment of range adjustment screw 85 and setting of adjustment screw 86. Substantially, any desired relationship between changes in input signal to the controller 1 and output signal therefrom can be obtained by proper shaping of cam 77 and adjustment of range spring 83.

While we have illustrated and described our invention by means of one embodiment, it will be understood that this is by way of explanation only and we do not desire to be limited thereby.

What we claim as new and desire to secure by Letters Patent of the United States is:

1. A pneumatic servo-motor for angularly positioning an output shaft in functional relation to changes in a pneumatic input pressure, comprising in combination, a support base, a force beam pivotally mounted on said support having a null position, a bellows responsive to said pneumatic input pressure applying a force to said beam proportional to the magnitude of the input pressure to effect angular displacement of said beam from said null position, a vane-nozzle couple, the nozzle of said couple carried by said beam so that angular displacement of the beam effects relative movement between said vane and nozzle, a fluid connection between said nozzle and the source of pneumatic pressure, a restriction in said connection so that relative movements of said vane and nozzle produce changes in the pneumatic pressure in said connection between said nozzle and restriction, a cylinder mounted on said support, a movable piston in said cylinder, a rolling diaphragm sealing said piston to said cylinder, a conduit connecting said cylinder to said fluid connection between the restriction and nozzle so that said piston is positioned in said cylinder proportional to changes in pressure in said connection, a rotatable shaft mounted on said support base, a tape drum mounted on said shaft, a piston rod carried by said piston, a tape connecting said piston rod to said tape drum so that as said piston moves said rotatable shaft is angularly positioned proportionately, a feedback cam carried by said rotatable shaft, a bell crank pivotally mounted on said support base having a first arm engaging said cam and a second arm, a yieldable connection between said second arm and said forced beam to apply a restoring force to said forced beam following a displacement of the null position by a change in pressure in said bellows, an output shaft rotatably mounted on said support base, a driven pulley mounted on said output shaft, a drive pulley mounted on said drive shaft and a belt engaging said drive and driven pulleys.

References Cited

UNITED STATES PATENTS

| 2,966,143 | 12/1960 | Panza | 91—387 |
| 3,018,763 | 1/1962 | Goerke | 91—387 |
| 3,084,550 | 4/1963 | Bowditch | 91—387 |
| 3,131,608 | 5/1964 | Yando | 91—387 |
| 3,215,346 | 11/1965 | Alberani | 91—387 |
| 3,222,996 | 12/1965 | Thieme et al. | 91—387 |
| 3,266,379 | 8/1966 | Kreuter | 91—374 |
| 3,290,996 | 12/1966 | Floyd | 91—387 |

MARTIN P. SCHWADRON, Primary Examiner.

B. L. ADAMS, Assistant Examiner.